United States Patent [19]

Wiedenman

[11] 4,237,535

[45] Dec. 2, 1980

[54] APPARATUS AND METHOD FOR RECEIVING AND SERVICING REQUEST SIGNALS FROM PERIPHERAL DEVICES IN A DATA PROCESSING SYSTEM

[75] Inventor: Gregory B. Wiedenman, Sandy, Utah

[73] Assignee: Sperry Rand Corporation, New York, N.Y.

[21] Appl. No.: 29,157

[22] Filed: Apr. 11, 1979

[51] Int. Cl.[3] .............................................. G06F 3/04
[52] U.S. Cl. ................................................... 364/200
[58] Field of Search ... 364/200 MS File, 900 MS File

[56] References Cited

U.S. PATENT DOCUMENTS

| 3,685,020 | 8/1972 | Meade | 364/200 |
|---|---|---|---|
| 4,059,851 | 11/1977 | Nutter, Jr. et al. | 364/200 |
| 4,090,238 | 5/1978 | Russo | 364/200 |
| 4,091,447 | 5/1978 | Dillon et al. | 364/200 |
| 4,152,761 | 5/1979 | Louie | 364/200 |
| 4,181,941 | 1/1980 | Godsey | 364/200 |

Primary Examiner—Harvey E. Springborn
Attorney, Agent, or Firm—Thorpe, North & Gold

[57] ABSTRACT

Peripheral devices of a microprocessor controlled system initiate service request signals which are sent to a system controller over a single dedicated request line. Such request signals are accepted by the system controller on a priority basis, with only one service request signal being honored at any given time. Once honored, the system controller addresses the peripheral device and accepts a vector request word therefrom. The vector request word is then used by the system controller to generate an index signal to select a microaddress of the microroutine to be used to service a peripheral device's request.

4 Claims, 6 Drawing Figures

APPARATUS AND METHOD FOR RECEIVING AND SERVICING REQUEST SIGNALS FROM PERIPHERAL DEVICES IN A DATA PROCESSING SYSTEM

BACKGROUND OF THE INVENTION

This invention relates to a batch data entry system and more particularly to apparatus and method for receiving and servicing request signals from peripheral devices of such a system.

Typically, batch data entry systems provide stand-alone keypunch data entry capability, and with such systems, it is no longer necessary to "punch" data on bulky cards or paper-tape prior to having it entered into a computing or storage system. Rather, a batch data entry system allows data to be entered, displayed, and stored on a variety of information exchange media, such as industry standard diskettes. Once the data is thus stored, it is readily available for cardless data entry into a separate computing system or for re-entry back into the batch data entry system where it can be redisplayed, reformatted, and modified. Data display may be via a printer or cathode ray tube (CTR) or both. Data entry may be via local or remote keyboard or through peripheral devices such as diskette readers. Once entered in the data entry system, the data may also be communicated directly to a separate computing system over a communication link.

As seen from the above description, a batch data entry system involves the operation of and interface with numerous peripheral devices. These peripheral devices are controlled by a "system controller" which operates according to established data processing principles. That is, instructions are retrieved from a system controller's memory and executed in a sequence and priority as determined by a microsequencer (or computer control unit) located within the system controller. The microsequencer typically follows a normal sequence of instructions, as set by the operator through manual controls or as fixed by the system's hardware, if certain specified events occur (such as the turning on of power or the setting of error flip-flops). An element is also usually provided to interrupt this normal sequence of instructions so that the system controller can service an external device such as supplying data to it, reading data from it, terminating its operation, etc., or branch to a predetermined place in the instruction stream (jump) in response to a control signal.

Peripheral devices of prior art data entry systems communicate with the system controller usually by one of two methods. In a first method, the system controller regularly polls the peripheral devices as part of its normal sequence of instructions to determine if a service request is present. If it is, that request is treated as an "interrupt" and if higher priority interrupts are not present, the system sequencer will branch or jump to a particular location in the instruction stream where the memory address of the desired service routine is located or generated. Once the memory address is thus identified, the system sequencer fetches the instruction(s) located thereat and inserts it (them) into the instruction stream, causing the desired service to be performed as requested by the peripheral device.

Polling offers the advantage of permitting peripheral device design to remain very simple (and hense inexpensive) because the great bulk of the system's intelligence (memory addresses and memory) remains in the system controller. However, polling presents the disadvantage of slowing down the response time to a peripheral device request. The device must first be polled, which may involve a significant wait time. Moreover, even after being polled several controller clock cycles may be consumed in locating the memory address (which process may require substantial software support) and fetching the instruction located therein.

The second method whereby peripheral devices of prior art data entry systems communicate with the system controller is known as direct memory access (DMA). In this approach, the peripheral devices are allowed to interrupt the system controller without having to wait to be polled. Thus the inefficiencies (wait times and address times) associated with the polling method are eliminated. However, the DMA approach adds more complexity within the peripheral device. This is because the peripheral device must know (have stored or generated within it) not only the service it wishes to have performed, but also the location (address) of that particular service routine within the system controller's memory.

Variations of the DMA approach provide for so-called priority vectored interrupts, i.e., interrupts to which a plurality of responses are possible according to a desired priority schedule. These systems typically require the support of complex software, with the corresponding increase in processor time. Some recent developments have diminished the need for such complex software, see Russo, U.S. Pat. No. 4,090,238, but the inherent disadvantage of the need for intelligent peripheral devices of DMA systems remains.

SUMMARY OF THE INVENTION

It is the primary object of the present invention to provide an arrangement whereby peripheral devices of a microprocessor controlled system may request and receive service from the system in an efficient and effective manner.

It is another object of the present invention to provide such a request and service arrangement which may be utilized with relatively simple peripheral devices.

It is a further object of the present invention to provide such a request and service arrangement which eliminates polling of the peripheral devices.

Still another object of the present invention is to provide a request and service arrangement which operates on a priority basis, with a higher priority peripheral device being able to request and receive service ahead of a lower priority device.

An additional object of the present invention is to provide a request and service arrangement which is compatible with the overall design and architecture of a complex batch data entry system, allowing all types of local and remote peripheral devices, such as printers, keyboards, CRT display, diskette devices, card punch/readers, data transmission controllers, etc., to enter, display, transmit, or store data of any kind.

These and other objects of the invention are realized in a specific illustrative embodiment thereof for use in a batch data entry system capable of receiving and servicing requests from a plurality of peripheral devices or line modules. The batch data entry system includes a system controller and a main memory, with each line module having direct request line to the system controller. A line module requests service by placing a logic signal on its request line, and if a request from a line module of higher priority is not pending, as determined by a priority encode logic unit located within the system controller, then the line module's request is honored as next described for one illustrative method.

First, an address for the line module is encoded by the system controller's priority encode logic unit and placed on a port number bus which is shared by all line modules.

Second, the presence of a valid address on the port number bus enables the particular line module addressed to ready its "request vector" for transfer to the system controller. A request vector is a data word which identifies the specific service the line module desires to have performed.

Third, at the appropriate time, as determined by an "enable vector" signal received from the system controller (and common to all line modules), the line module's request vector is clocked onto a bi-directional data bus, also common to all line modules and the system controller.

Fourth, upon receipt of the request vector from the line module, the system controller combines selected bits of the request vector with other bits generated within the system controller to form an index word for a "register stack" within the system controller.

Fifth, the index word thus formed points to a particular location within the register stack where the address in either the main memory or a system controller memory of the requested service has previously been loaded.

Sixth, the address thus indexed is transferred to the system controller's microsequencer, where it directs the microsequencer to fetch the instructions located at the specified address.

Seventh, the instructions thus fetched are executed, causing the desired service to be performed for the particular line module which requested it.

The system controller is adapted to carry out the foregoing steps in a minimum number of processor clock cycles.

BRIEF DESCRIPTION OF THE DRAWINGS

The above and other objects, features and advantages of the invention will be more apparent from the following more particular description of a preferred embodiment of the invention, as illustrated in the accompanying drawings.

DETAILED DESCRIPTION OF THE INVENTION

The following detailed description is concerned with an application of the invention used in a system controller housed in an operator console (master workstation) that comprises part of a batch data entry system. However, the invention is not limited to use in a batch data entry system, and other embodiments of the invention, e.g., any microprocessor or computer controlled system that must interface with one or more peripheral devices, are possible.

Figure 1:
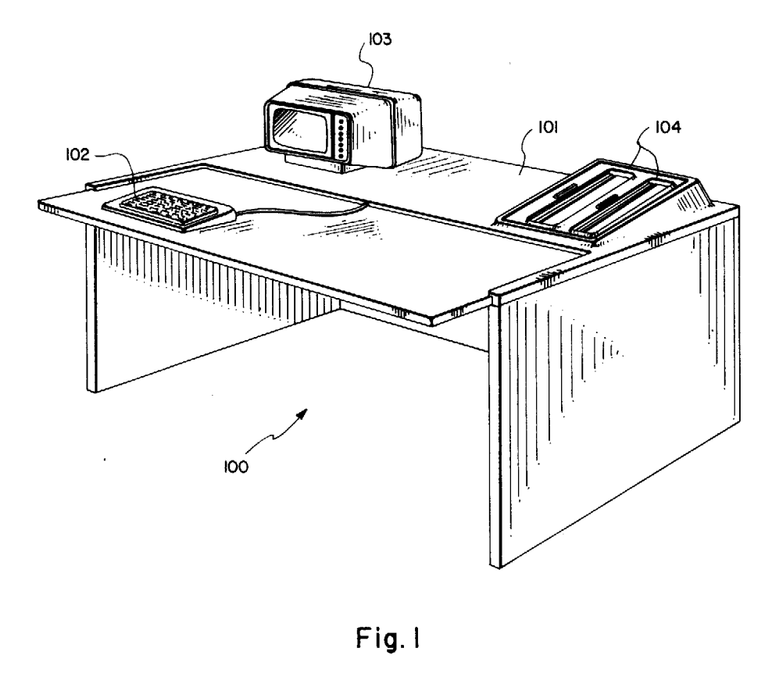
FIG. 1 shows a pictorial view of a master workstation in which the preferred embodiment of the invention is housed.

Referring now to the drawings, FIG. 1 is a perspective view of the external appearance of a master workstation 100 used in a batch data entry system in which the system controller, including the invention, is housed. As FIG. 1 illustrates, the master workstation 100 consists of a desk-type stand 101, a movable keyboard assembly 102, a CRT display 103, and one or two diskette drives 104. The actual hardware and circuitry comprising the system controller is mounted on printed circuit boards located underneath and towards the back of the desk-type stand 101. Suitable wire harnesses and cable assemblies are used to interconnect the various printed circuit boards with each other and with the other elements of the master workstation 100, such as the keyboard assembly 102, the CRT display 103, and the diskette drives 104. A power supply is also housed on the underneath side of the desk-type stand 101 in order to provide the necessary power for all the elements and circuitry that are housed in or on the master workstation 100.

Each of elements shown in FIG. 1, i.e., the keyboard assembly 102, the CRT display 103, and the diskette drives 104, are peripheral devices which must interface and communicate with the system controller. Other peripheral devices, such as card punch/readers, printers, or communication units (to transfer the data over a communication link to another location) may also be connected to, and hence interface with, the system controller. Moreover, additional workstations, absent the system controller, comprising keyboard assemblies, CRT displays, and diskette drives, may also interface and communicate with the master workstation 100 in which the system controller is located.

The above mentioned peripheral devices, and any others with which the system controller could communicate, will hereinafter be referred to as "line modules." These line modules periodically request various services from the system controller. For example, a given line module may request that data be transferred to it, or that data be read from it, or that a particular routine be terminated. The manner in which the system controller responds to and services these various requests is, of course, the subject matter of this invention.

Figure 2:
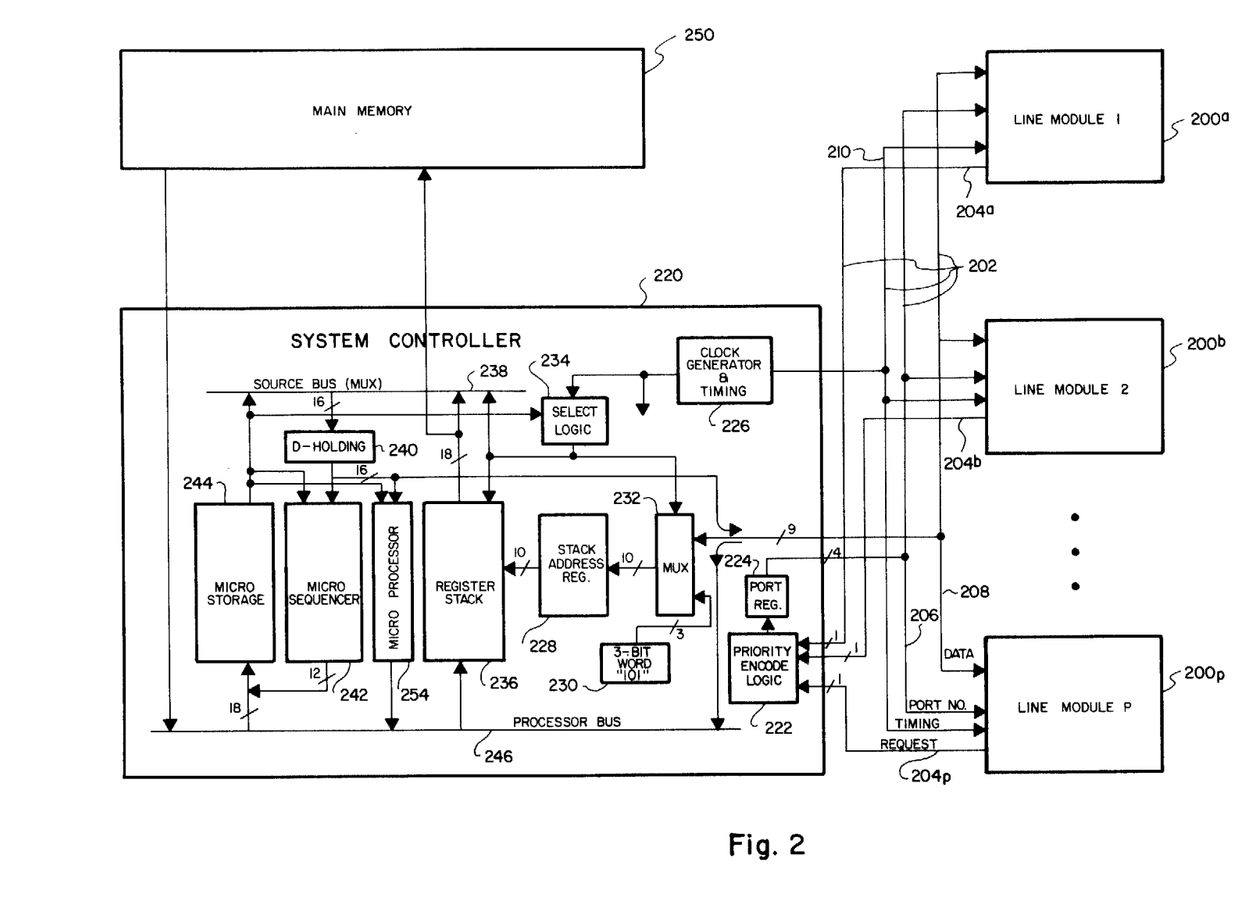
FIG. 2 shows a block diagram schematic of the key elements that comprise the invention.

Referring now to FIG. 2, there is illustrated a block diagram schematic showing the key elements that comprise the invention. Line modules 200a, 200b, . . . 200p are connected to a system controller 220 by a connecting network of data and control lines 202. Included within this connecting network 202 are dedicated request lines 204a, 204b, . . . 204p, one for each line module 200a, 200b, . . . 200p respectively. Also included within the connecting network 202 is a four-line port number bus 206 which is shared in common by all the line modules. A nine-line data bus 208 is likewise included within the connecting network 202 and is shared in common by all the line modules. Various timing and clock signals are also routed to the line modules through the connecting network 202 over timing and clock lines 210. Only one of these timing and clock signals, termed "enable vector," is of principle interest to the invention here under consideration.

Also shown in FIG. 2 are the various functional elements of the system controller 220 that comprise the invention. The dedicated request lines 204a, 204b, . . . 204p, where each request line is connected to a different line module, are routed to a priority encode logic unit 222 where the port number of the highest priority line module is determined. In the preferred embodiment of the invention herein described, the highest priority line module is defined as the one with the highest number. Thus, in FIG. 2, line module 2 is of higher priority than line module 1, and line module p is the highest priority of all. Also, in the preferred embodiment of the invention, the number of line modules that may interface with the system controller 220 is sixteen, thus the port number may be represented as a four-bit word.

Request for service signals are supplied by requesting line modules to the priority encode logic unit 222 in response to a clock signal from the clock and generator timing circuitry 226. The priority encode logic unit 222 determines which of the requesting line modules has the highest priority and produces a four-bit word or port number which identifies the highest priority line module. This port number is routed to the port number bus 206 where it is connected to all the line modules via the connecting network 202. Once on the port number bus 206, this port number serves as an address to the line module which it represents and as an indication to that line module that its request for service has been honored.

As soon as a line module senses that its request for service has been honored, it will cause a nine-bit "vector request" word to be clocked onto the data bus 208 in response to the "enable vector" signal which is periodically generated by the clock generator and timing circuitry 226 of the system controller 220. This "enable vector" signal is routed to the line modules over one of the timing and clock lines 210. The "vector request" word includes seven information bits used by the system controller 220 as an index to select the microaddress of the microroutine that is to be used to service the line module request. Within the line module there is a unique vector associated with each type of request that can be raised. Two more bits are used with the "vector request" word for parity check purposes, but such use is not of importance to the present invention.

The seven informational bits of the "vector request" word are combined with three additional bits generated within the system controller to form a ten-bit address word which is stored in a stack address register 228. These three additional bits are the logic bits "101" and their generation is shown functionally at block 230 in FIG. 2. The combination of the seven vector request bits and the three additional bits "101" occurs in a stack address register multiplexer 232. In the preferred embodiment of the invention, many other source inputs, not shown in FIG. 2, are connected to the stack address register multiplexer 232. This allows the system controller to select numerous sources to be loaded into the stack address register 228, and thus permits the system controller 220 to perform numerous other functions not directly related to the present invention. Select logic 234 determines which of the various sources tied to the inputs of the stack address register multiplexer 232 will be routed to its ten output lines.

A register stack 236, which illustratively is a 1024 word (18 bits per word) random access memory (RAM), is used to store, among other items, the microaddress of the location of the microroutine that corresponds to the vector request received from the line module, i.e., the microroutine to be used to service the line module request. These microaddresses, in the preferred embodiment of the invention, are always stored in octal addresses 01200 through 01376. When these octal addresses are converted to binary addresses (each octal digit is converted to its binary equivalent), it will be seen that the first three bits, excluding the intial 0's, are always "101." For example octal address 01200 becomes 000001010000000 and octal address 01376 becomes 000001011111110. Thus, by adding the bits "101" to the seven informational bits of the "vector request" word, as described above, the general location of the microaddresses in the register stack 236 is identified. The microaddresses are typically loaded into the register stack 236 from external storage media during the initialization sequence of the system controller and remain stored therein so long as power is maintained.

When the register stack 236 is enabled by receipt of the certain signals from the select logic 234, the 18 bits of data stored therein at the address specified by the stack address register 228 are transferred to a source bus 238. Of these 18 bits, 16 are data or informational bits and 2 are parity bits. While the source bus 238 is functionally illustrated in FIG. 2 as a bus, in actuality it is a multiplexing arrangement with sixteen outputs which are directed to a D-holding register 240. Selection of the appropriate input to the source bus 238 to be directed to the D-holding register 240 is made by the select logic 234.

Thus, for purposes of the invention hereunder consideration, it is seen that the 10-bit word stored in the stack address register 228 (which word is composed of the seven informational bits of the requesting line module's "vector request" word, plus the three bits "101") serves as an index, or address, into the register stack 236. At the location indicated by this address, the microaddress of the microroutine corresponding to the line module's request vector is stored. Upon receipt of the proper enabling signals from the select logic 234, this microaddress appears at the outputs of register stack 236. At the appropriate time, this microaddress is then routed through the source bus (multiplexer) 238 and is clocked into the D-holding register 240.

With the microaddress of the desired microroutine stored in the D-holding register 240, the system controller 220 is primed to jump to that address and begin fetching the microinstructions of the microroutine located thereat. These microinstructions tell the system controller 220 exactly what machine instruction it is to perform, e.g., shift a register, set a flip-flop, or enable a gate. This jump to the microinstruction address is accomplished using conventional microprocessor techniques once the microaddress is loaded into a microsequencer 242. Briefly summarized, these techniques provide for the microsequencer 242 to generate the sequence of microaddresses which will produce the desired sequence of microinstructions for the system controller to follow.

Once given an initial microaddress, the microsequencer 242 has the capability, among other options, to increment or decrement that microaddress for the next microinstruction. Thus, if the desired sequence of microinstructions are sequentially stored at a known starting microaddress, the microsequencer can fetch them all in the correct sequence using only the initial starting microaddress. Such is the case for the vast majority of microinstructions relating to this invention.

That is, these microinstructions which define the various services which the line modules may request from the system controller, are sequentially stored in a microstorage area 244. If a more lengthy routine is desired, the microinstruction may refer the system controller 220 to the main memory 250 where a very complex set of instructions may be stored. Or, the microinstruction may be routed back to the microsequencer 242 where it can serve as a new starting microaddress for another set of instructions. However, all of the above description as to how the microsequencer 242 acts upon the microaddress received from the D-holding register 240 merely represents basic microprocessor technology and does not represent the novel portion of this invention. It is briefly described here to clarify the environment in which the invention may operate.

The microsequencer 242 causes the designated microinstructions to be supplied to a microprocessor 254 which executes the microinstructions to thereby service the request of the line module in question.

Figure 3:
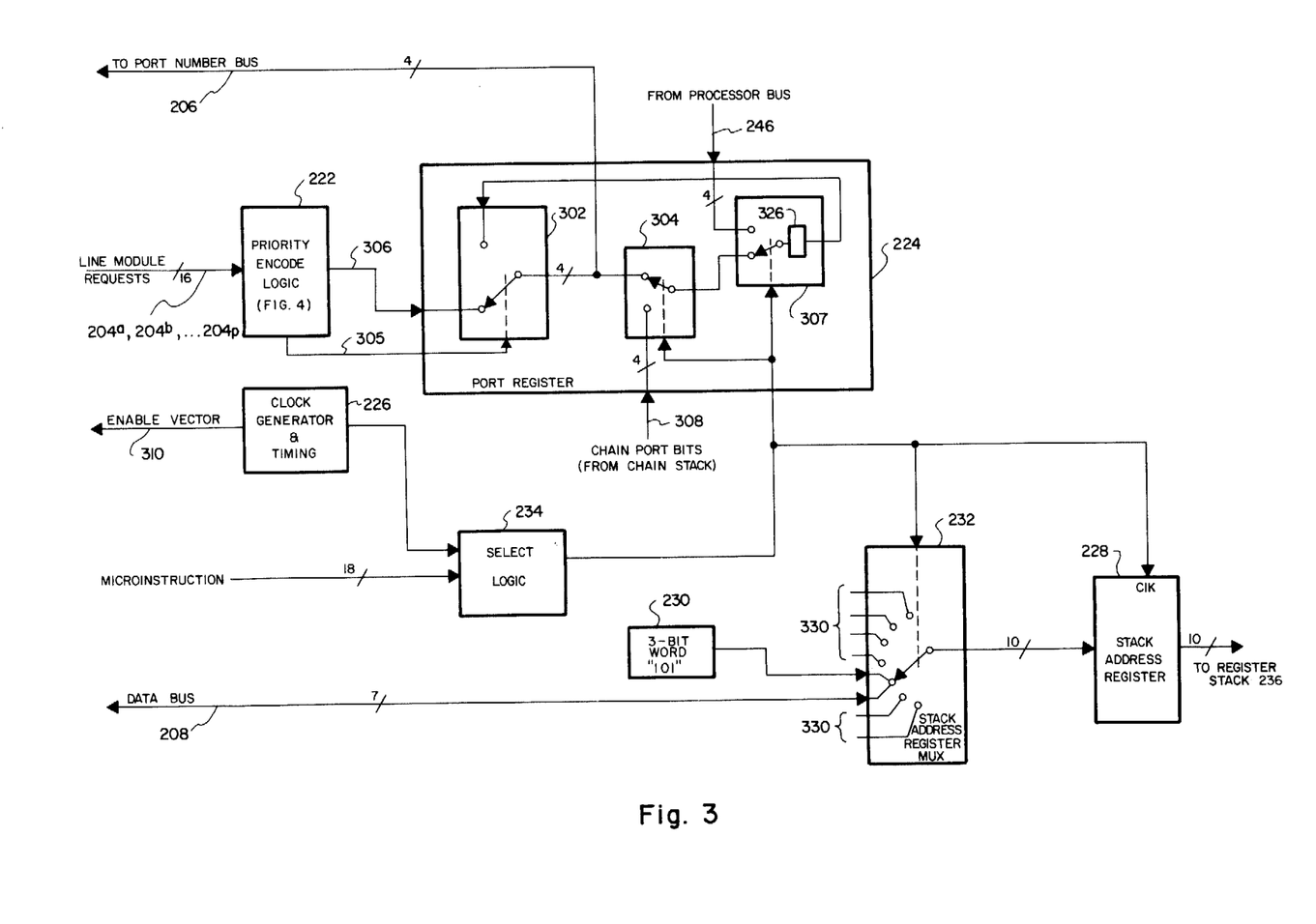
FIG. 3 shows a more detailed schematic of that portion of the FIG. 2 circuitry which generates the line module address and gates the vector request signal into the stack address register.

FIG. 3 shows a more detailed block diagram schematic of that portion of the invention which generates the address of the highest priority line module. Those elements of FIG. 3 which correspond to elements of FIG. 2 are numbered the same as the corresponding FIG. 2 elements. Sixteen dedicated request lines 204a, 204b, ... 204p are routed from each line module to the priority encode logic unit 222. The priority encode logic unit 222 determines the port number of the highest priority line module and encodes it into a four-bit port number. Such encoding is realized in the preferred embodiment of the invention by using commercially available integrated circuits as shown in FIG. 4.

Figure 4:
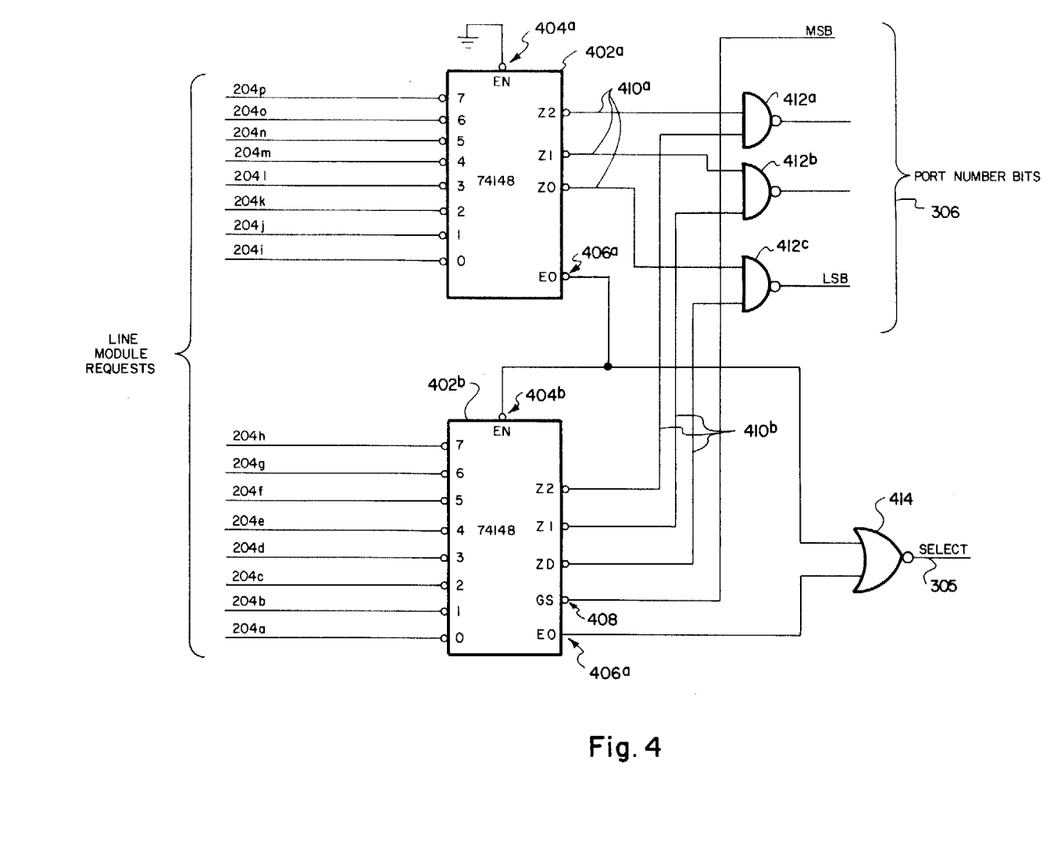
FIG. 4 shows exemplary circuitry for the priority encode logic unit 222 of FIG. 3.

As FIG. 4 illustrates, two 8-line-to-3-line priority encoders 402a and 402b are cascaded together to provide the priority encode logic unit 222 of FIGS. 2 and 3. The higher priority line modules are connected to encoder 402a and the lower priority line modules are connected to encoder 402b. An enable input 404b of encoder 402b is tied to an enable output 406a of encoder 402a so that whenever a request appears on any of the upper, or higher-priority request lines, the lower priority encoder 402b is disabled and its GS output 408 is forced to a logical one level. This forces the most significant bit (MSB) of the four-bit port number 306 to also be a logical one. Moreover, three output lines 410b of the lower priority encoder 402b are likewise kept in the logical 1, or high level, state when the circuit is disabled or when no signals appear at any of its inputs. Hence, three NAND gates 412a, 412b, and 412c act as inverters with respect to the three output lines 410a of the higher priority encoder 402a. Because the encoders 402a and 402b are designed so that their three output lines $Z_0$, $Z_1$ and $Z_2$ present the octal inverse of the highest order input line, the net result is that the four port-number bits 306 carry the binary coded decimal equivalent of the highest order input line on which a request signal appears. If no request signals appear on any of the input lines to the higher priority encoder 402a, then its three output lines 410a all remain at the logical one level, its enable output line 406a enables the lower priority encoder 402b, the GS output 408 is forced to a logical zero level, and the three output lines 410b will carry the octal inverse of the highest order input line on which a request may appear. Again, because the NAND gates 412a, 412b, and 412c act as inverters, the net result is that the number of the highest order input line on which a request signal is present appears in binary form on the four port number bit lines 306. The encoders 402a and 402b could illustratively be what are known as 74148-type priority encoders such as manufactured by Texas Instruments.

Referring again to FIG. 3, the four output lines 306 of the priority encode logic unit 222 are routed to a multiplexer 302, which forms part of the port register 224. It is the function of this multiplexer to select one of two possible input sources and route these sources to subsequent multiplexers within the port register 224. The first input source is the output of the priority encode logic unit 222. The second input source originates as one of the outputs of a storage multiplexer 307. This second input source is selected whenever there are no request signals present on any of the 16 inputs to the priority encode logic unit 222. The multiplexer 302 is implemented in the preferred embodiment of the invention by using a commercially available quadruple 2-line-to-1-line data selector/multiplexer. Control of the multiplexer 302 is by a select line 305 on which is generated a signal which is the logical NOR function of the two enable outputs 406a and 406b of the priority encoders 402a and 402b of FIG. 4.

Figure 5:
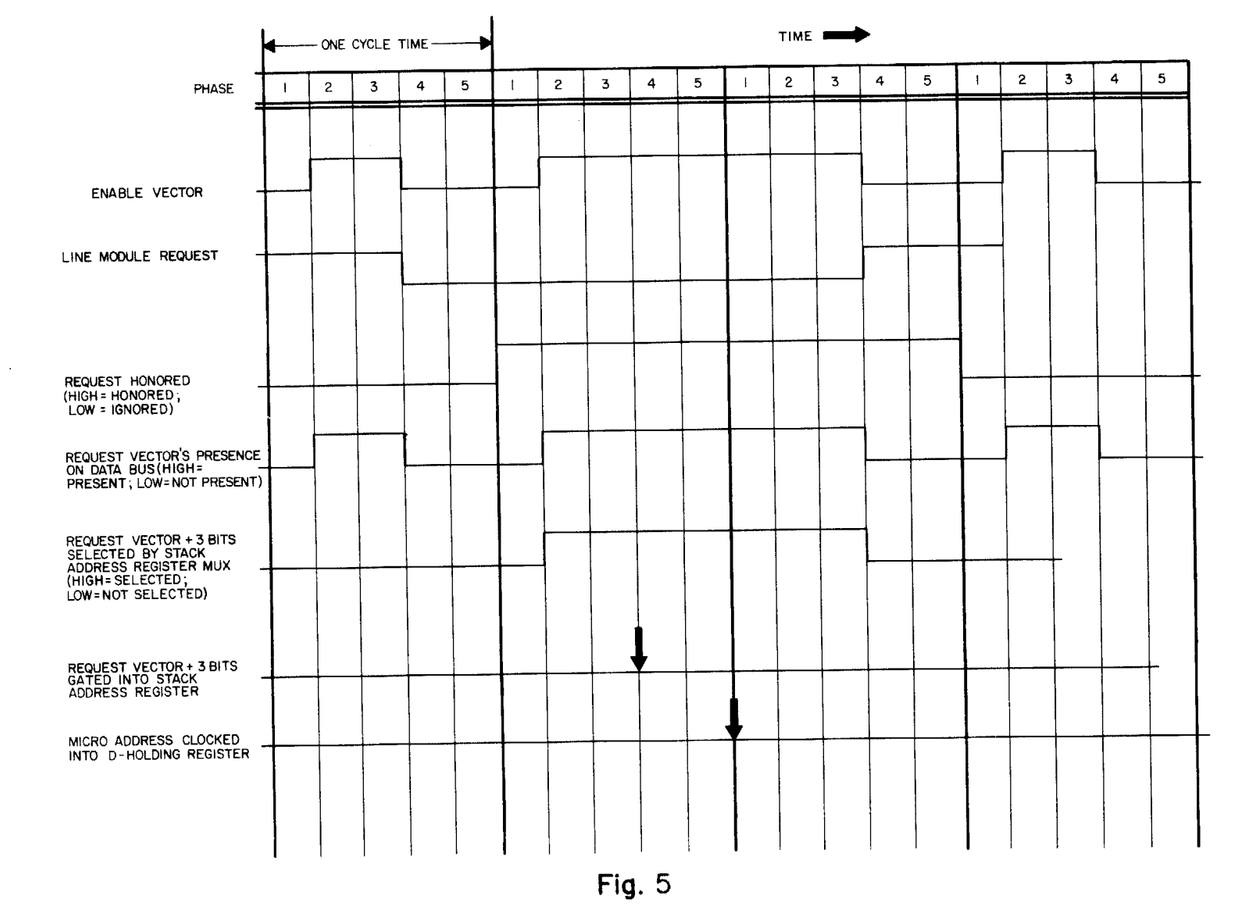
FIG. 5 shows a timing sequence diagram which illustrates the order in which the key signals and events related to FIG. 3 occur.

As FIG. 3 illustrates, port register 224 is actually a combination of three multiplexers. The first, 302, has already been discussed. The second, 304, which is implemented using the same type of commercially available integrated circuits as the multiplexer 302, selects either the four outputs of the multiplexer 302 or the four outputs from a chain stack (not shown). The chain stack, which will be discussed somewhat later, is not part of the present invention but rather concerns the servicing of requests which may originate from sources other than the line modules. The third, 307, selects either the four lines which are the output of the second multiplexer 304, or four bits from the processor bus 246. For purposes of the invention disclosed herein, the multiplexer 307 will always select the output from the second multiplexer 304; but for other applications, such as writing data to the line modules, the system controller would use the multiplexer 307 to select an appropriate four bits on the processor bus 246 to serve as an address of a desired line module, which address would be sent to the line modules over the port number bus 206 by way of the first multiplexer 302. The significance of multiplexer 307 for purposes here, however, is to provide for holding a particular line module address on the port number bus 206 until the service requested by the line module is completed. Because of this "storage" function, achieved by a built-in element 326, a 4-bit address will always appear on the port number bus 206. If no requests are received from any of the line modules, then the priority encode logic unit 222 causes the lowest priority line module, address 0000, to be generated. The operation of the circuitry of FIG. 3 will next be discussed in conjunction with the FIG. 5 timing diagram. The timing diagram of FIG. 5 illustrates a five-phase clock signal used by the system controller, with each phase having a fixed and equal duration and beginning coincident with the end of the preceding phase. Taken together, the five phases thus make up the system controller's total cycle time.

Each phase signal, and combinations thereof, are generated using conventional clock sources and combinational logic. This generation occurs functionally in the clock generator and timing block 226 of FIGS. 2 and 3. One of the key timing signals that relates to this invention is the "enable vector" signal previously discussed. As FIG. 5 shows, this signal is normally high for phase 2 and 3 of the system controller's cycle time, and low for phases 4, 5 and 1. On the trailing edge of this high (end of phase 3), line module request signals are clocked from any requesting line modules to the priority encode logic unit. When a line module's request for service has been honored (to be explained below), or when the system controller executes a data transfer to or from a line module (not relevant here), the above-mentioned pattern of the "enable vector" signal is modified. Specifically, when a line module request has been honored, the "enable vector" signal remains high beginning with phase 2 of one cycle and ending with phase 3 of the next cycle (see FIG. 5), after which line module requests for service can again be examined.

As its name implies, the function of the "enable vector" signal, in addition to clocking request signals from the line modules to the priority encode logic unit, is to enable the request vector of the addressed line module to be transferred to the system controller. The addressed line module uses the "enable vector" signal to place the vector associated with its request onto the data bus 208 (FIG. 3). In other words, a request vector appears on the data bus everytime the "enable vector" signal goes high and the line module in question is addressed via the port number bus by the priority encode logic unit. However, unless the system controller has honored the line module's request signal, the request vector on the data bus 208 is ignored (not selected by the stack address register multiplexer 232) and the "enable vector" signal is dropped at the end of phase 3.

If the system controller has honored the request signal, the select logic 234 (FIG. 3) generates the appropriate code to enable the stack address register multiplexer 232 to select the data bus as its source, plus 3 bits of fixed data, and route the resulting 10 bit word to the stack address register 228 where it is stored. The time at which this 10-bit word is clocked into the stack address register is the transistion time between phase 3 and phase 4 of that cycle during which a line module request has been honored (see FIG. 5).

The stack address register multiplexer 232 operates to route information from other sources in the system controller to the stack address register 228, such as indicated by input lines 330. For purposes of this disclosure, however, the only function the stack address register multiplexer 232 serves is to select the seven information bits from the line module data bus 208 and the three generated bits "101" when a line module request is honored and the enable vector signal is high.

The line module request signal, in the preferred embodiment of the invention, is generated by a latching circuit located within the line module. A high level signal generated by this latching circuitry indicates that no request is present, while a low signal indicates that a request has been made. The trailing edge of the "enable vector" signal, which signal is routed to all line modules via one of the timing and control lines 210 (FIG. 2), is used to update this latch thus granting the line module great flexibility with respect to removing or modifying its request signal and corresponding request vector.

As discussed earlier, only the highest priority line module request is recognized by the priority encode logic unit 222. But even if a line module request is of the highest priority among other line module requests, the system controller may not honor it. A line module's request is "honored" only by having its 4-bit port number, as determined by the priority encode logic unit 222, clocked into storage element 326 of multiplexer 324b of the port register 224.

Clocking, or honoring, of a line module request occurs within a cycle period as shown in FIG. 5 unless a higher priority request from a source other than a line module is being serviced by the system controller. That is, the system controller includes a task scheduler which handles all requests on the basis of priority. For example, within the system controller 220 there may be located numerous error flags (flip-flops or other storage devices) which may be set during a preceding microroutine execution, e.g., a flag indicating that a parity error has been sensed. These error flags may be of higher priority than line module requests, and thus, if an error flag is set, the select logic 234 inhibits the clock signal which would otherwise clock the line module request into the storage portion of the port register 224. That is, the presence of the error flag precludes the "honoring" of the line module request. Similarly, line module requests may be of higher priority than other requests within the system controller, such as timer, high priority chain, chain, and background requests. Likewise, timer requests may be of higher priority than high priority chain, chain, and background requests, and so on. Chain requests are requests that have been temporarily tabled because other requests have taken priority over them. Such tabled requests are placed in a chain stack (register) which allows all entries to be serviced on a first-in, last-out basis.

Figure 6:
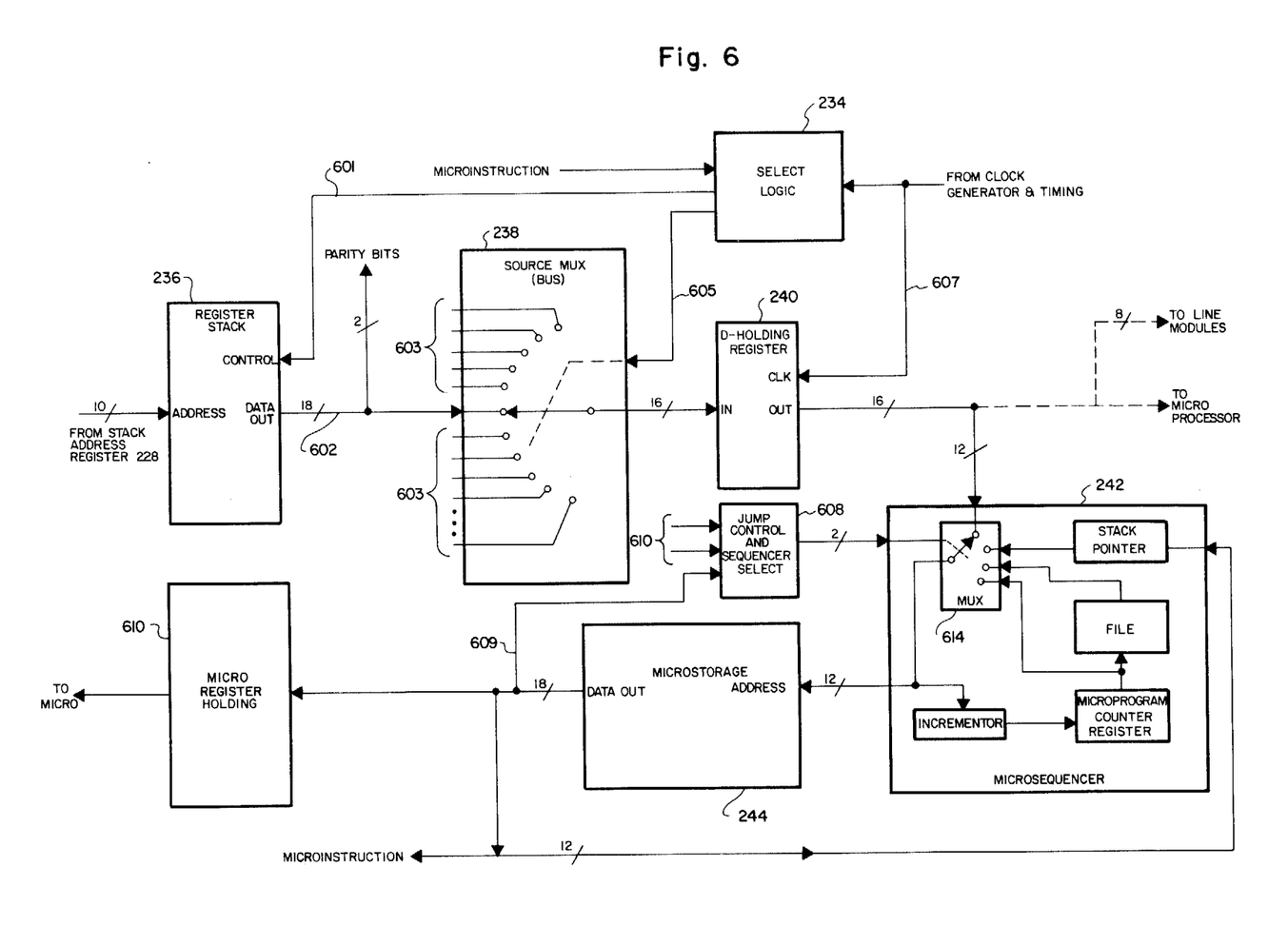
FIG. 6 shows a more detailed schematic of that portion of the FIG. 2 circuitry which locates the microinstruction address and routes it to the microsequencer.

Referring now to the block diagram schematic of FIG. 6, it is seen that the output of the stack address register 228 (from FIG. 3) serves as the address input to the register stack 236. The number stored in the stack address register 228 (which number is the vector request word from the highest priority line module plus the three generated bits "101") identifies that portion of the information stored within the register stack which is to be directed to the source bus 238. Implementation of the register stack 236 is achieved by the use of commercially available bipolar RAMs. Appropriate control signals instructing the register stack 236 that it is to have data read from it (as opposed to having data written in it) are generated by select logic 234 whenever a request signal has been honored and the enable vector signal is raised (see timing diagram of FIG. 5). Thus, with the register stack placed in the read mode, the data stored at the specified address will appear on the eighteen output lines 602 as soon as the address signals appear at register stack's address input lines.

From the register stack 236, the microaddress of the requested service routine is routed through the source bus (multiplexer) 238 to the D-holding register 240. Note from FIG. 6 that of the eighteen output lines of the register stack 236, two are parity bits and are not routed through the source bus 238 to the D-holding register 240.

The source bus 238 is implemented in the preferred embodiment of the invention by using conventional 8-line-to-1-line data selectors/multiplexers. The only signals required for their proper operation are three select inputs to specify which of the eight input sources is to be selected. The select inputs used to control the source bus (multiplexer) 238 are generated by the select logic 234. As was the case for the control signals of the register stack, these select signals are generated using conventional logic techniques whenever a request signal has been honored and the enable vector signal is raised.

The D-holding register 240 is implemented, for example, using four quad-D flip-flops. Four such devices provide the capacity to hold 16 bits of data. Input data is transferred to the output at the leading edge of the phase 1 clock signal (see FIG. 5).

As FIG. 6 illustrates, the output of the D-holding register 240 is connected to various elements of the system controller. For example, for some applications the microprocessor will accept the data, whereas for other applications, such as when data is sent to a line module, the data is accepted by a line module bus transceiver (not shown) which in turn sends it to the line modules over the line module data bus 208. However, where the D-holding register contains the microaddress of the next microroutine which the system controller is to perform, as is the case for the invention herein disclosed, the data is always accepted by the microsequencer 242. The microsequencer uses this address to find the starting location in microstorage 244 where the first microinstruction of the desired microroutine is located. And, as its name implies, once the microsequencer knows the starting location of the desired routine, it will sequence through all of the microinstructions necessary in order to complete the microroutines.

The methods used by the microsequencer to fetch and execute the various instructions the system controller is asked to perform represents standard microprocessor technology. Accordingly, one with skill in the art could implement a microprocessor system which would act upon the microaddress stored in the D-holding register 240 in the desired fashion. FIG. 6 illustrates one arrangement that could be used to accomplish this goal and represents the arrangement used in the system with which the preferred embodiment of the invention is used.

In FIG. 6, the microsequencer 242 is implemented using three commercially available 4-bit 2909-type microprogram sequencer integrated circuits (available from Motorola, Advanced Micro Devices, and other manufacturers). The microsequencer 242 works in conjunction with the microstorage memory 244, a microregister holding circuit 610, and jump control and sequencer select circuitry 608. Microstorage 244 consists of 1024 words of PROM and 1024 words of RAM, with each word being 18 bits long. The PROM portion is implemented using five commercially available 1024×4 bipolar PROMs, such as the N825136 made by Signetics. The RAM portion is implemented using eighteen commercially available 1024×1 bipolar static RAMs; such as the 93415 also manufactured by Signetics.

The microregister holding circuit 610 is a register used to hold a microinstruction while it is being executed. It is implemented using various configurations of D-type flip-flops.

Finally, the jump control and sequencer select circuit 608 is used to determine the sequencer's action on the next instruction. In addition to the microinstruction input 609, other inputs 612 include condition codes and external jump signals. Its output consists of two encoded bits which control an internal multiplexer 614 located within the microsequencer 242. Implementation of the jump control and sequence select circuitry is achieved by using commercially available D-type flip-flops and assorted logic gates.

While the invention herein disclosed has been described by means of a specific embodiment and application thereof, there are numerous modifications and variations thereof which could be made by those skilled in the art. It is therefore to be understood that within the scope of the appended claims, the invention may be practiced otherwise than as specifically described herein.

What is claimed is:

1. Apparatus including processing means for servicing requests from a plurality of peripheral devices in which each peripheral device includes a request line over which request signals are sent by the device when service is requested, each device being responsive to a device address signal which identifies the device and an enable vector signal for producing a vector request signal which identifies the service requested by the device, said apparatus including
    priority logic means coupled to said request lines and responsive to said vector request signals received over one or more of the request lines for producing a device address signal which identifies the peripheral device of those requesting service which has the highest priority,
    means for periodically producing enable vector signals,
    means for supplying said produced device address signal and enable vector signal to said highest priority peripheral device,
    storage means for storing instructions which define the operations suitable for servicing requests from the peripheral devices,
    register stack means included in the processing means for storing address information which identifies the locations in said storage means where said instructions are stored,
    means responsive to each vector request signal for producing index signals which identify the locations in said register stack means containing the address information which identifies the locations in said storage means where the instructions for servicing the request of the request vector are stored, and
    means for supplying the index signals to the register stack means included within the processing means for reading out a said instruction for performing the operation so as to service the request from the identified peripheral device.

2. Apparatus as in claim 1 wherein said priority logic means includes encoder means for producing a device address data word which identifies that one of the requesting peripheral devices which has the highest priority, said apparatus further including
    a register means for temporarily storing the device address data word, and
    means for applying the device address data word to said highest priority peripheral device.

3. Apparatus as in claim 1 wherein said vector request signal comprises a multi-bit data word, and wherein said index signal producing means comprises
    means for supplying a fixed binary data word,
    means for combining said fixed binary data word with at least a portion of the bits of each vector request multi-bit data word to form an index signal word, and
    stack address register means for temporarily storing said index signal word,
    and wherein said address information is stored in said register stack means in a range of locations specified by said fixed binary data word bits.

4. A method by which data processing apparatus services requests from a plurality of peripheral devices, wherein peripheral device produces request signals and, in response to an enable vector signal and a certain device address signal, vector request signals which specify the requested service, said method including the steps of producing, in response to production by one or more of the peripheral devices of request signals, a device address signal identifying the peripheral device having the highest priority of those requesting service, supplying to the peripheral devices an enable vector signal and the produced device address signal, supplying a said vector request signal by the identified peripheral device, producing, in response to the supplied vector request signal, an index signal which identifies the location in a register stack containing address information as to the locations in a storage means wherein instructions for servicing the vector request are stored, and supplying the index signal to said data processing apparatus so as to permit such apparatus to service the vector request supplied by the identified peripheral device.

* * * * *